(12) United States Patent
Tanaka

(10) Patent No.: US 6,452,635 B1
(45) Date of Patent: Sep. 17, 2002

(54) IMAGE PICKUP APPARATUS

(75) Inventor: Kazuyuki Tanaka, Chofu (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/088,366

(22) Filed: Jun. 2, 1998

(30) Foreign Application Priority Data

Oct. 17, 1997 (JP) .............................................. 9-285276

(51) Int. Cl.[7] .............................................. H04N 5/225
(52) U.S. Cl. ........................ 348/342; 348/335; 348/241
(58) Field of Search ................................ 348/220, 229, 348/231, 232, 335, 340, 342, 360, 241, 222; 359/494, 495, 496, 497, 498; H04N 5/225

(56) References Cited

U.S. PATENT DOCUMENTS

| | | | |
|---|---|---|---|
| 5,481,381 A | | 1/1996 | Fujimoto |
| 5,555,479 A | * | 9/1996 | Nakagiri ...................... 359/355 |
| 5,568,197 A | * | 10/1996 | Hamano ...................... 348/342 |
| 5,589,882 A | * | 12/1996 | Shiraishi et al. ............ 348/340 |
| 6,088,059 A | * | 7/2000 | Mihara et al. ............... 348/335 |

FOREIGN PATENT DOCUMENTS

| | | |
|---|---|---|
| JP | 4-9803 | 1/1992 |
| JP | 4-321377 | 11/1992 |
| JP | 6-324262 | 11/1994 |
| JP | 6-331941 | 12/1994 |
| JP | 2524569 | 5/1996 |
| JP | 9-238357 | 9/1997 |

* cited by examiner

*Primary Examiner*—Tuan Ho
(74) *Attorney, Agent, or Firm*—Pillsbury Winthrop LLP

(57) ABSTRACT

A high-precision image pickup apparatus in which the degradation of optical performance due to unwanted orders of diffracted light is electrically minimized at high speed and with high accuracy. The apparatus has an image-forming optical system (1), an image pickup device (3), and a signal processing device (4) for converting signals obtained into a displayable image signal. The image-forming optical system (1) includes a diffraction surface. In order to reduce a diffraction image formed by an order of diffracted light unnecessary for image for formation in the image converted into the image signal, the signal processing device (4) has a device (6) for storing the point spread function of the unwanted order of diffracted light; a device (8) for selecting electric signals having an intensity higher than a predetermined value from the electric signals obtained from the image pickup device (3) and for calculating the convolution of an object image formed from the selected electric signals with the point spread function of the unwanted order of diffracted light to obtain a flare signal; and a device (9) for reducing or removing the flare signal from a signal representing the object image.

11 Claims, 5 Drawing Sheets

FIG. 4(a)
FIG. 4(b)
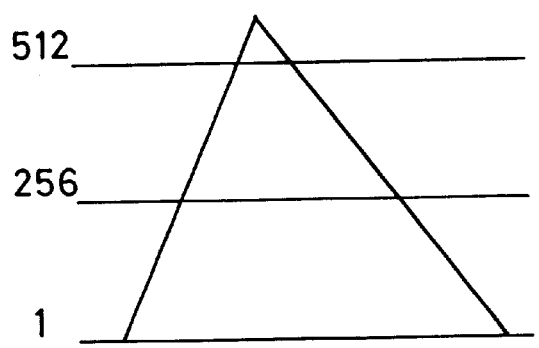
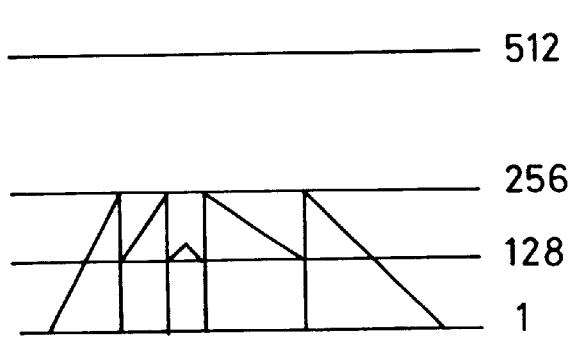
FIG. 4(c)
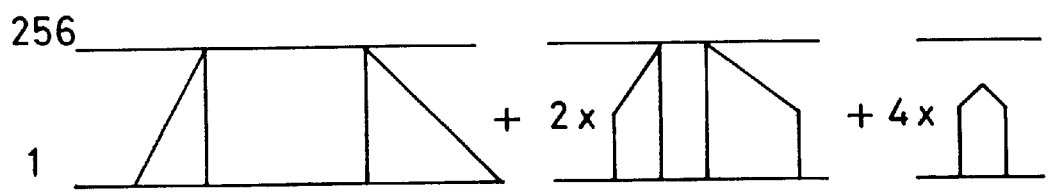

FIG. 5

START
↓

Photograph with correct exposure : image ①
↓
Photograph with 1/2 of correct exposure : image ②
↓
Photograph with 1/4 of correct exposure : image ③

↓

In image ①, convert intensity of pixels having signal intensity not lower than 256 into 0 : image ④
↓
In image ②, convert intensity of pixels having signal intensity not lower than 256 or not higher than 127 into 0 : image ⑤
↓
In image 3, convert intensity of pixels having signal intensity not higher than 127 into 0 : image ⑥

↓

In images ④ to ⑥, calculate convolution for pixels having signal intensity not lower than 1
↓
Obtain images ⑦, ⑧ and ⑨ for images ④, ⑤ and ⑥, respectively

↓

Add together images ⑦, ⑧ and ⑨
↓
obtain predictive flare image: image ⑩
↓
Multiply predictive flare image by coefficient: image ⑪

↓

Image ① - image ⑪ = image ⑫ : flare-free image

↓

END

IMAGE PICKUP APPARATUS

BACKGROUND OF THE INVENTION

The present invention relates to an image pickup apparatus and, more particularly, to an image pickup apparatus having a signal processing device in which an image of an object formed by an image-forming optical system including a diffractive optical element is converted into electric signals by an electronic image pickup device and the electric signals are converted into a displayable image signal.

It is known that a diffractive optical element has the function of diverging an optical path by using a plurality of different orders of diffracted light and also has the function of converging diffracted light through an annular zone-shaped diffraction grating. It is also known that a diffractive optical element arranged to have a light-converging action, for example, can readily produce aspherical waves and is therefore remarkably effective in correcting aberrations, and that because it has substantially no thickness, a diffractive optical element can be disposed in an optical arrangement with a high degree of freedom and is therefore useful to construct a compact optical system, and further that because the dispersion characteristic quantity of diffractive optical elements which is equivalent to the Abbe's number in refracting lenses is a negative value, a diffractive optical element as combined with a refracting optical system is markedly effective in correcting chromatic aberrations. Techniques of improving the performance of optical systems by using these features of diffractive optical elements are described in detail, for example, in Binary Optics Technology: The Theory and Design of Multi-Level Diffractive Optical Element, Gary J. Swanson Technology Report 854, MIT Lincoln Laboratory, August. 1989. Further, Japanese Patent Application Unexamined Publication (KOKAI) Nos. 6-331941 and 6-324262 are known as prior arts that include such a diffractive optical element as an image-forming lens.

Japanese Patent Application Unexamined Publication (KOKAI) No. 4-9803 and Japanese Patent No. 2,524,569 (B2) are known as prior arts that make use of a diffractive optical element to diverge an optical path by using a plurality of different orders of diffracted light. The former prior art uses a diffractive optical element as a low-pass filter for removing moire from an electronic image pickup device. The latter prior art uses a diffractive optical element as a color separation optical system.

In general, light incident on a diffractive optical element is split into a plurality of different orders of diffracted light. In a case where a diffractive optical element is constructed as a lens element, for example, the fact that there are a plurality of different orders of diffracted light is equivalent to that there are a plurality of focal points. This is unfavorable for an image-forming optical system except a special case.

In a case where it is intended to construct an optical system using a specific order of diffracted light and where other orders of diffracted light have an adverse effect on the desired optical performance, it is necessary to remove diffracted light other than the specific order. In this regard, it is known that as shown in the sectional view of FIG. 1, the sectional configuration of a relief pattern A for diffraction is formed into a sawtooth shape (blazed), thereby concentrating the energy of light on a specific order of diffracted light and preventing other orders of diffracted light from being produced.

However, even if the sectional configuration of the relief pattern is formed into a sawtooth shape as shown in FIG. 1, a wavelength at which the light energy can be concentrated to the full (hereinafter referred to as "optimization wavelength") varies according to the depth of the sawtooth grooves, and it is impossible to concentrate the energy of light in a band having a wavelength width on a specific order of diffracted light. This phenomenon gives rise to no problem in a case where a monochromatic light source, e.g. laser light, is used. However, in the case of an image pickup apparatus which uses white light, e.g. a camera, the diffraction efficiency reduces at wavelengths other than the optimization wavelength, and the light energy disperses to other orders of diffracted light.

FIG. 2 shows the relationship between the diffraction efficiency of first-order diffracted light, which is a working order of diffracted light, and the wavelength with regard to a diffractive optical element having a sectional configuration such as that shown in FIG. 1. In this case, the relief pattern is for ed on a substrate of glass BK7 by determining the groove depth such that first-order diffracted light is 100% when the wavelength $\lambda$ is 530 nanometers. The wavelength band shown in FIG. 2 extends over a range of from $\lambda$=400 nanometers to $\lambda$=700 nanometers, which is generally regarded as a visible wavelength region. The diffraction efficiency reduces as the wavelength deviates from the optimization wavelength $\lambda$=530 nanometers.

FIG. 3 shows the relationship between the zero-order diffraction efficiency and second-order diffraction efficiency on the one had and the wavelength on the other in this example. It will be understood from FIG. 3 that the amounts of zero-order diffracted light and second-order diffracted light increase in the short-wavelength region and the long-wavelength region, in which the amount of first-order diffracted light reduces.

If such a diffractive optical element is used as a lens element of an image pickup apparatus which uses white light, e.g. a camera, diffracted light other than a specific working order of diffracted light appears as a colored flare or ghost, causing the image-forming performance to be degraded.

In a case where a diffractive optical element is used in an image pickup apparatus which uses image formation by an image-forming lens at in the above-described example, it is necessary to remove a flare image formed by diffracted light other than a specific working order of diffracted light at wavelengths other than the optimization wavelength, or to reduce the effect of the flare image.

SUMMARY OF THE INVENTION

In view of the above-described circumstances, an object of the present invention is to provide a high-precision image pickup apparatus in which the degradation of optical performance due to unwanted orders of diffracted light at wavelengths other than the optimization wavelength for a diffractive optical element is electrically minimized at high speed and with high accuracy.

To attain the above-described object, the present invention provides an image pickup apparatus including an image-forming optical system which forms an image of an object, and an electronic image pickup device which converts the image into electric signals, The image pickup apparatus further includes a signal processing device for converting the signals obtained from the electronic image pickup device into a displayable image signal. The image-forming optical system includes a diffraction surface having an image-forming action or an action whereby image-forming performance is improved. In order to reduce a diffraction image formed by an unwanted order of diffracted light, which is unnecessary for image formation, in the image converted into the image signal, the signal processing device has a device for storing a point spread function of the unwanted order of diffracted light, and a device for selecting electric signals having an intensity higher than a predetermined value from the electric signals obtained from the electronic image pick up device and for calculating the convolution of an object image formed from the selected electric signals with the point spread function of the unwanted order of diffracted light to obtain a flare signal. The signal processing de ice further has a device for reducing or removing the flare signal from a signal representing the object image.

The function of the above-described arrangement will be explained. The image pickup apparatus according to the present invention includes an image-forming optical system which forms an image of in object, and an electronic image pickup device which converts the image into electric signals. The image pick up apparatus further includes a signal processing device for converting the signals obtained from the electronic image pickup device into a displayable image signal. The image-forming optical system includes at least one diffractive optical element. The diffractive optical element has an image-forming action or an action which enables image-forming performance to be improved by combination with another lens element. The image pickup apparatus has a device for electrically processing the image signal in order to reduce flare caused by unwanted orders of diffracted light.

In a case where thy optimization wavelength of a diffractive optical element is set in the vicinity of 530 nanometers, as shown in FIG. 3, the diffraction efficiency of unwanted-order diffracted light increases as the wavelength deviates from the optimization wavelength. The rise in the diffraction efficiency of unwanted-order diffracted light has a deteriorative effect on the image quality for the reason stated below. A diffractive optical element used for an image-forming lens has an optimum power for a specific order so that aberration correction is made effectively. However, the diffraction angle of unwanted-order diffracted light other than the order used for design differs from that of the design order of diffraction. Therefore, large aberrations occur. This is a cause of flare.

The point spread function (point image energy intensity distribution) of a flare image formed by unwanted-order diffracted light is known in advance. Therefore, if an object image formed is convolved with the point spread function of unwanted-order diffracted light, a flare image that causes the image quality to be deteriorated is obtained. If the flare image obtained is used to reduce or remove flare from the image taken, a clear image free from a flare image is obtained Because the diffraction efficiency of unwanted-order diffracted light is low in comparison to the diffraction efficiency of the design order of diffraction, a flare image of unwanted-order diffracted light is mainly produced from an object of high luminance. Accordingly, it is desirable that the convolution calculation for obtaining a flare image should be performed with respect to only pixels having a high image signal level in the pixels of the object image formed. By doing so, the number of pixels to be subjected to calculation decreases, and thus the time required for computational processing is shortened. Subtracting the flare obtained by the calculation from the object image gives an image having minimal deterioration of the image quality.

The convolution is expressed by $$Q(x,y)=\int\int Img(x+u,+y+v)\times PSF(u,v)dudv \qquad (1)$$

where $Q(x,y)$: the intensity of the image of unwanted-order diffracted light at the position $(x,y)$ $Img(x,y)$: the in tensity of the image of the design order of diffracted light at thy position $(x,y)$ $PSF(u,v)$: the p int spread function of unwanted-order diffracted light x: the horizontal coordinate of the object image y: the vertical coordinate of the object image u: the horizontal coordinate of the point spread function v: the vertical coordinate of the point spread function Because the image formed is discretely sampled by the image pickup device, the convolution is expressed by $$Q(i,j)=\Sigma_m\Sigma_n Img(i+m,j+n)\times PSF(m,n) \qquad (2)$$

where i: the horizontal pixel number in the object image j: the vertical pixel number in the object image u: the horizontal pixel number in the point spread function v: the vertical pixel number in the point spread function.

As will be understood from Eq. (2), the time required for the convolution calculation is proportional to the product of the number of pixels of the image field and the size of the point spread function. Therefore, it takes a considerable operation time to perform the convolution calculation for all of the pixels. Accordingly, it is desirable from the viewpoint of shortening the operation time to reduce the number of pixels to be subjected to the convolution calculation. Therefore, the calculation is performed with respect to only pixels having a high image signal level as stated above. Consequently, the operation time is shortened, and a flare image formed by unwanted-order diffracted light can be removed at high speed and with high accuracy. Thus, a clear image can be obtained.

As a criterion for selection of pixels to be subjected to the convolution calculation, it is desirable to use a predetermined value wit in a range of from 30% to 90% of the maximum value of the image signal intensity. If the selection criterion is lower than the lower limit, i.e. 30%, the number of pixels to be subjected to arithmetic processing increases, causing the processing time to increase. On the other hand, if the selection criterion is higher than the upper limit, i.e. 90%, the number of pixels to be subjected to arithmetic processing becomes excessively small. Consequently, a flare image cannot arithmetically be predicted with a sufficiently high degree of accuracy, and the flare removing effect is weakened.

In addition, the present invention provides an image pickup apparatus including an image-forming optical system which forms an image of an object, and an electronic image pickup device which converts the image into electric signals. The image pick up apparatus further includes a signal processing device for converting the signals obtained from the electronic image pickup device into a displayable image signal. The image-forming optical system includes a diffraction surface having an image-forming action or an action whereby image-forming performance is improved. In order to reduce a diffraction image formed by an unwanted order of diffracted light, which is unnecessary for image formation, in the image converted into the image signal, the image pickup apparatus takes a plurality of object images under different exposure conditions almost simultaneously, and the signal processing device has a device for storing a point spread function of the unwanted order of diffracted light, and a device for selecting electric signals having an intensity higher than a predetermined value from electric signals obtained from at least one of the object images and for calculating the convolution of the object image having the selected electric signals with the point spread function of the unwanted order of diffracted light to obtain a flare signal. The signal processing device further has a device for reducing or removing the flare signal from a signal representing the object image.

The function of the above-described arrangement will be explained. In general, an image pickup device has only a certain dynamic range. Therefore, if an object having a luminance exceeding the dynamic range is present in the image field, an image signal obtained from the image pickup device does not represent accurate information. In the convolution calculation, if the image signal intensity of the object image is not accurate, the resulting flare image also becomes inaccurate. To obtain an accurate image signal intensity from an object having a luminance exceeding the dynamic range, it is preferable to take an image with a reduced exposure in addition to an image taken with an optimum exposure. It is also desirable to take the two images almost simultaneously in order to make the imaging ranges of the two images equal to each other.

Further, if a plurality of images taken under different exposure conditions are combined to produce an image having a wide dynamic range, the operation time is shortened, and the processing speed is improved favorably. This will be explained with reference to FIG. 4. Let us assume that a camera system has a limited, narrow dynamic range with which the signal intensity can be expressed by values only in the range of from 1 to 256. Part (a) of FIG. 4 shows an object image intensity distribution exceeding the narrow dynamic range.

First, the object is photographed by multiplying the amount of exposure by ½ or ¼ so that the intensities of pixels exceeding 256 or 512 fall within the narrow dynamic range, thereby enabling the pixel intensities to be expressed by values not larger than 256. Next, among the coefficient-multiplied pixels, signals having an intensity not lower than 256 and those having an intensity not higher than 127 are converted to zero. Consequently, a distribution such as that shown in part (b) of FIG. 4 is obtained.

The distribution shown in part (b) of FIG. 4 can be expressed by three distributions shown in part (c) of FIG. 4. This corresponds to the distribution shown in part (a) of FIG. 4.

Next, each signal expressed in the narrow dynamic range is convolved with the point spread function of unwanted-order diffracted light, and the signals obtained by the convolution calculation are multiplied by 1, 2 and 4, respectively, and then added together [although it is shown in part (c) of FIG. 4 that the intensity distributions are multiplied by the coefficients and then added together, in actual practice the intensity distributions are added together after each has been subjected to the convolution calculation]. The signal obtained in this way is equivalent to what is obtained by convolving a signal of wide dynamic range with the point spread function of unwanted-order diffracted light. The above-described series of operations is shown in the flowchart of FIG. 5.

With a view to simplifying the calculation for obtaining a flare image and reducing the required storage capacity, it is preferable that among the plurality of object images taken under different exposure conditions, an image taken with a short exposure time should be used for the convolution calculation.

In addition, the present invention provides an image pickup apparatus including an image-forming optical system which forms an image of an object, and an electronic image pickup device which converts the image into electric signals. The image pickup apparatus further includes a signal processing device for converting the signals obtained from the electronic image pickup device into a displayable image signal. The image forming optical system includes a diffraction surface having an image-forming action or an action whereby image-forming performance is improved. In order to reduce a diffraction image formed by an unwanted order of diffracted light, which is unnecessary for image formation, in the image converted into the image signal, the signal processing device has a device for storing a point spread function of the unwanted order of diffracted light, and a device for selecting electric signals having an intensity higher than a predetermined value from the electric signals obtainer from the electronic image pickup device and for calculating the convolution of an object image formed from the selected electric signals with the point spread function of the unwanted order of diffracted light after lowering the resolution of the object image, thereby obtaining a flare signal, and then reducing or removing the flare signal from a signal representing the object image.

In addition, the present invention provides an image pickup apparatus including an image-forming optical system which forms an image of an object, and an electronic image pickup device which converts the image into electric signals. The image pickup apparatus further includes a signal processing device for converting the signals obtained from the electronic image pickup device into a displayable image signal. The image forming optical system includes a diffraction surface having an image-forming action or an action whereby image-forming performance is improved. In order to reduce a diffraction image formed by an unwanted order of diffracted light, which is unnecessary for image formation, in the image converted into the image signal, the signal processing device has a device for storing a point spread function of the unwanted order of diffracted light, and a device for calculating the convolution of an object image having electric signals having an intensity higher than a predetermined value, which are selected from the electric signals obtained from the electronic image pickup device, with the point spread function of the unwanted order of diffracted light after lowering the resolution of the object image, thereby obtaining a flare signal, and then restoring the resolution of the obtained flare signal to a previous level and reducing or removing the flare signal from a signal representing the object image.

The function of the above-described arrangements will be explained. The convolution is expressed by the above Eq. (1) and also expressed by the above Eq. (2). As will be understood from Eq. (2), the time required to calculate the convolution is proportional to the product of the size of the image field and the size of the point spread function. Therefore, it takes a considerable time to perform the convolution calculation For the whole image field. Accordingly, it is desirable with a view to shortening the operation time to reduce the size of the image field or the size of the point spread function.

The point spread function of unwanted-order diffracted light is large in comparison to the point spread function of the design order of diffracted light because unwanted-order diffracted light does no focus on the image plane. Therefore, even if the resolution of the object image is lowered, there is almost no change in the condition of the flare image. The term "resolution" as used herein means the sampling interval for the image field. In the calculation of the convolution, if the resolution of the object image is lowered, the number of pixels to be subjected to the calculation decreases, and thus the processing time is favorably shortened. It is preferable to set the resolution of the point spread function equal to that of the object image. By doing so, the convolution calculation processing is simplified. It is preferable to restore the resolution of the image obtained by the calculation to the previous level. By doing so, the calculation for removing or reducing the flare image is simplified.

In the above-described image pickup apparatuses, it is preferable that when the convolution is calculated in the signal processing device point spread functions calculated under the identical light source should be used regardless of a light source used when the image is taken. The point spread function of unwanted-order diffracted light is determined by the condition of the image-forming lens, the order of diffraction, the diffraction efficiency, the position of the object and the spectral distribution of the light source. Among these factors, the photographing conditions of the image-forming lens, i.e. the focal length and the aperture ratio, together with the spectral distribution of the light source, are variable. However, because the point spread function of unwanted-order diffracted light has a large spread, it is preferable with a view to saving the storage capacity used in the camera to store and use a minimal number of point spread functions which are calculated using a typical focal length and aperture ratio and a single light source or which are optimized by spectral distributions of a plurality of light sources.

In the above-described image pickup apparatuses, it is preferable that the signal processing device should have a plurality of point spread functions prepared according to the condition of the image-forming lens and the image height, and when the convolution is calculated in the signal processing device, a point spread function for an arbitrary image height should be calculated by an approximate operation from a plurality of adjacent point spread functions. It is preferable for the camera to store a large number of point spread functions because there are various object distances of objects taken in the image field and the point spread function varies according to the photographing conditions and the image height. However, in order to save the storage capacity, it is desirable to store a point spread function for each image height under typical photographing conditions. Further, it is desirable to minimize the number of point spread functions prepared for each photographing condition and for each image height with a view to saving the storage capacity. In this case, it is desirable to calculate a point spread function for an arbitrary photographing condition and for an arbitrary image height by an approximate operation from a plurality of adjacent point spread functions.

In the above-described image pickup apparatuses, it is preferable that in the signal processing device, the resolution for expressing the point spread function should be lowered below the resolution of the object image, and when the convolution is calculated, intensity data concerning either of the point spread function and the object image should be calculated by an approximate operation in order to make the resolution for expressing the point spread function and the resolution of the object image equal to each other. In other words, it is desirable with a view to saving the storage capacity to minimize the number of grating elements for expressing the point spread function. To make the resolution of the point spread function expressed by the reduced number of grating elements equal to the resolution of the object image, it is desirable to calculate intensity data concerning either of the point spread function and the object image by an interpolation and to thereby make the two resolutions equal to each other.

In the above-described image pickup apparatuses, it is desirable that when the convolution is calculated in the signal processing device, the point spread function should be rotated about the center of the image field of the object image. In general, an image-forming lens produces aberrations symmetric with respect to the optical axis. Accordingly, flare formed by unwanted-order diffracted light also occurs in symmetry with respect to the optical axis. It is desirable to calculate the convolution while rotating the point spread function of unwanted-order diffracted light in point symmetry with respect to the center of the image field in order to calculate the flare image accurately.

Still other object and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 4 is a diagram for explaining signal processing in a case where the dynamic range is limited.

FIG. 5 is a flowchart showing a series of operations for the signal processing in FIG. 4.

DESCRIPTION OF THE PREFERRED EMBODIMENTS

Figure 1:
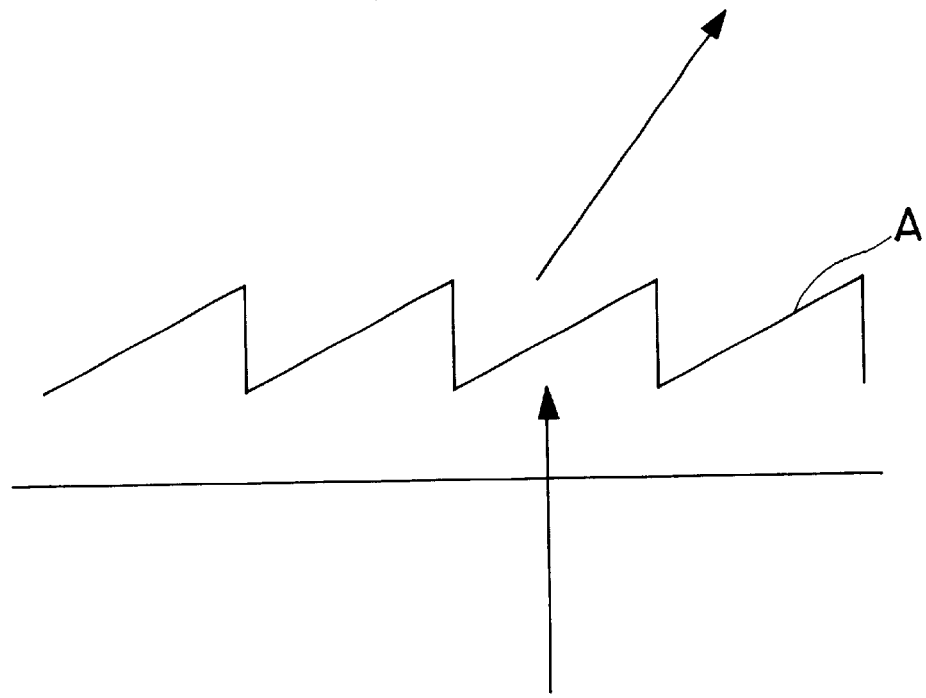
FIG. 1 is a section 1 view of a blazed diffractive optical element.
Figure 2:
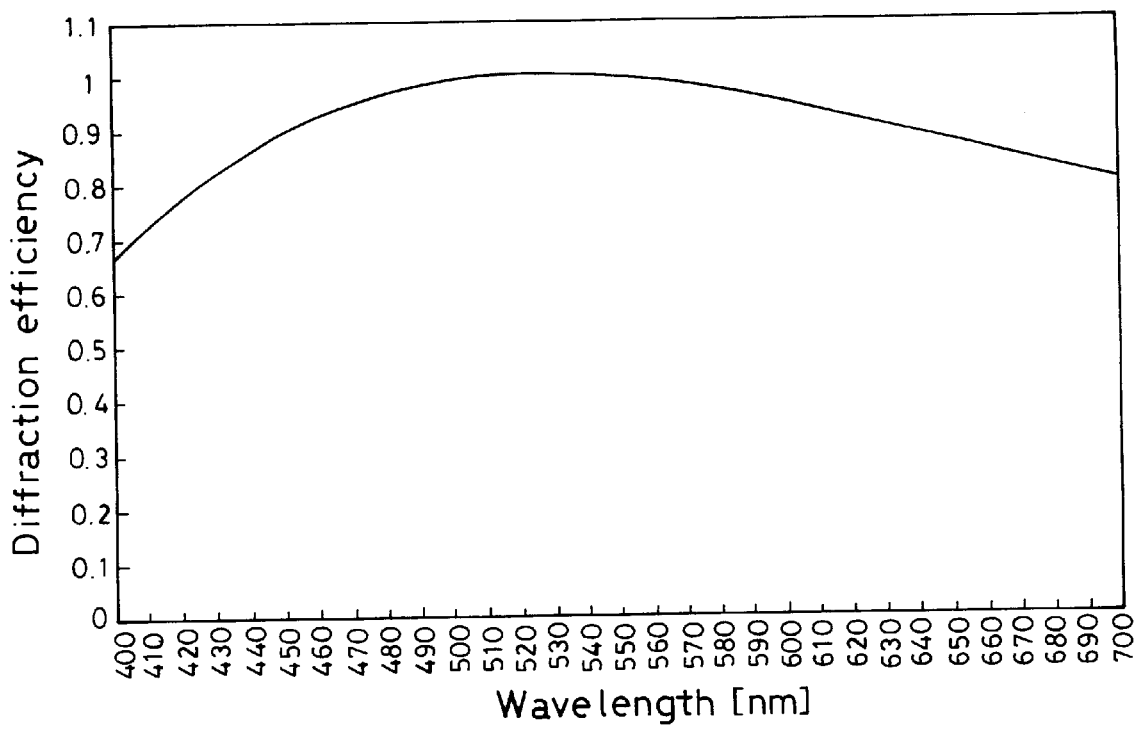
FIG. 2 is a graph showing the relationship between the diffraction efficiency of first-order diffracted light used by a diffractive optical element and the wavelength.
Figure 3:
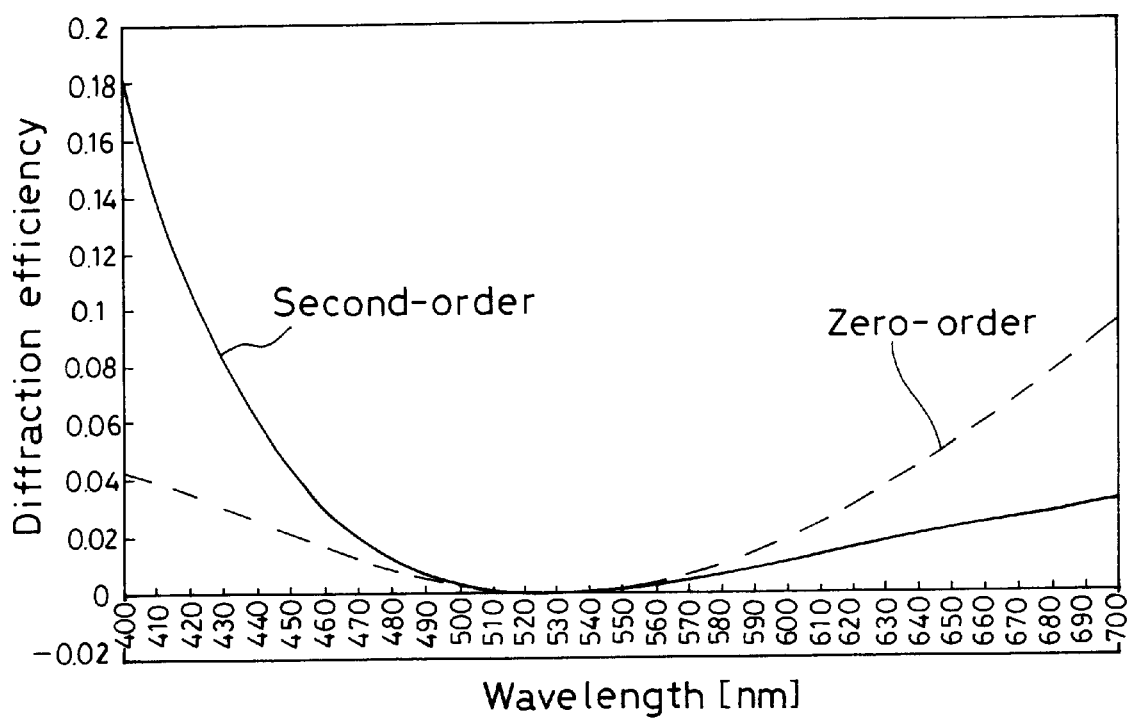
FIG. 3 is a graph showing the relationship between the diffraction efficiency of each of zero-order diffracted light and second-order diffracted light, which are unnecessary for a diffractive optical element, and the wavelength.
Figure 6:
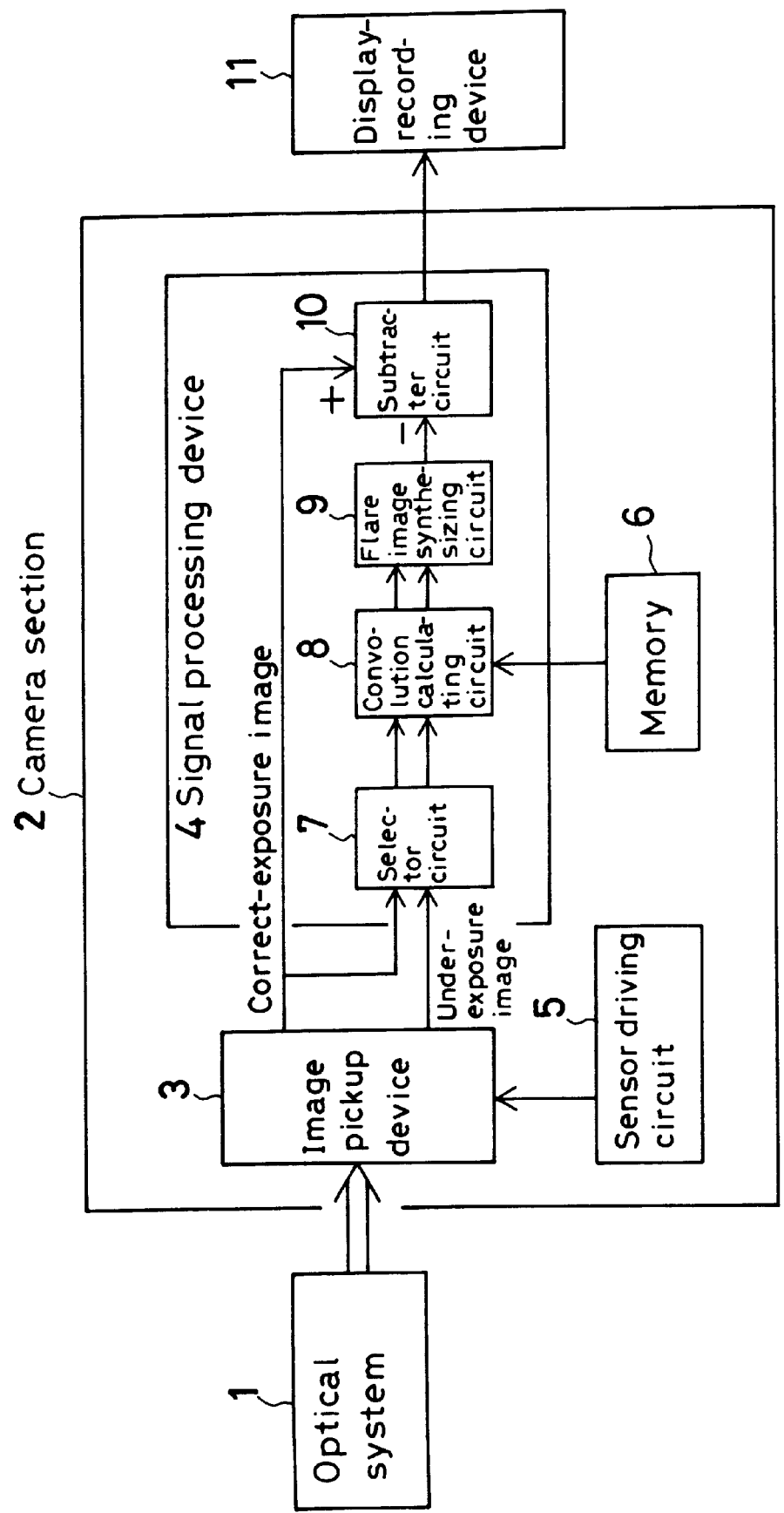
FIG. 6 is a block diagram showing the whole arrangement of an image pickup apparatus according to an embodiment of the present invention.

An image pickup apparatus according to an embodiment of the present invention will be described below. FIG. 6 is a block diagram showing the whole arrangement of this embodiment. In the figure, reference numeral 1 denotes an image-forming optical system. A camera section 2 is provided therein with a solid-state image pickup device 3, a signal processing device 4, a sensor driving circuit 5, and a memory 6. The signal processing device 4 has a selector circuit 7, a convolution calculating circuit 8, a flare image synthesizing circuit 9, and a subtracter circuit 10. A processed image is outputted to a display-recording device 11.

An image of an object to be photographed is formed on a light-receiving surface of the solid-state image pickup device 3 by the image-forming optical system 1. The camera section 2 photographs to images under different exposure conditions almost instantaneously. One of the images is taken under correct exposure. The other image is taken under underexposure. The solid-state image pickup device 3 converts these images into electric signals and outputs two image signals to the selector circuit 7. The convolution calculating circuit 8 performs a convolution calculation using pixel signals selected by the selector circuit 7 and the point spread function of unwanted-order diffracted light stored in the memory 6. To shorten the time required for the computational processing, the convolution calculation is performed by selecting pixels having a signal intensity not lower than 80% of the maximum value of the image signal. Next, the flare image synthesizing circuit 9 synthesizes a flare image on the basis of data obtained from the two image signals by the convolution calculation. Next, the subtracter circuit 10 subtracts the flare image synthesized by the flare image synthesizing circuit 9 from the image taken under correct exposure to obtain a clear image free from a flare image. The image delivered from the signal processing device 4 is outputted to the display-recording device 11 and displayed on a display or recorded in a recorder.

The signal processing device 4 will be explained below more specifically. The signal processing device 4 may be roughly divided into a convolution calculating part 8 which obtains a flare image and a part 9 which subtracts the flare image from the image taken under correct exposure. As is well known, the convolution is given by the following equation.

The intensity Q (x, y) of an image at a certain position (x,y) is expressed by $$Q(x,y) = \int\int Img(x+u, y+v) \times PSF(u,v) du dv \quad (1)$$

Because the image formed by the optical system 1 is discretely sampled by the image pickup device 3, the convolution is expressed by $$Q(i,j) = \Sigma_m \Sigma_n Img(i+m, j+n) \times PSF(m,n) \quad (2)$$

The convolution calculating part 8 uses the underexposure image and the point spread function. It is preferable to lower the resolution of the underexposure image once because the number of pixels decreases if the resolution is lowered, and thus the processing speed is improved. To save the storage capacity of the memory 6, the point spread function (PSF) may be set as shown for example in the table below:

| | Image height ratio | | | | | |
|---|---|---|---|---|---|---|
| F-numbers | 0.1 | 0.2 | 0.4 | 0.6 | 0.8 | 1.0 |
| 2.8 | $PSF_{11}$ | $PSF_{12}$ | $PSF_{13}$ | $PSF_{14}$ | $PSF_{15}$ | $PSF_{16}$ |
| 5.6 | $PSF_{21}$ | $PSF_{22}$ | $PSF_{23}$ | $PSF_{24}$ | $PSF_{25}$ | $PSF_{26}$ |
| 11.0 | $PSF_{31}$ | $PSF_{32}$ | $PSF_{33}$ | $PSF_{34}$ | $PSF_{35}$ | $PSF_{36}$ |

For an arbitrary F-number, PSF at an arbitrary image height is expressed by $$PSF = k_1 k_2 \times PSF_{i,j} + (1-k_1) \times k_2 \times PSF_{i+1,j} + k_1 \times (1-k_2) \times PSF_{i,j+1} + (1-k_1) \times (1-k_2) \times PSF_{i+1,j+1} \quad (3)$$

where $i = [inum-1] \times r/r_0$ $k_1 = (inum-1) \times r - i$ $j = [fnum-1] \times \rho$ $k_2 = (fnum-1) \times \rho - j$ $\rho = (Fno - Fnomin)/(Fnomax - Fnomin)$ r: the distance from the center of the image field tq the point (x,y)

$r_0$: the distance from the center of the image field to the most peripheral portion of the image field Fno: the aperture ratio of the optical system Fnomin: the minimum value of the aperture ratio of the optical system Fnomax: the maximum value of the aperture ratio of the optical system

[ ] expresses; the maximum integer that does not exceed the value inside [ ].

For example, as a point spread function for the F-number 4.0 and the image height ratio 0.5, a mean of $PSF_{13}$, $PSF_{14}$, $PSF_{23}$ and $PSF_{24}$ is used.

Further, because aberrations occur in point symmetry with respect to the optical axis, it is preferable to perform a calculation while rotating PSF about the center of the image field from the viewpoint of obtaining a calculation result with higher accuracy. Assuming that the point spread function is expressed by a matrix and the matrix is P, a matrix P' that expresses the rotated point spread function is given by $$P' = R(\theta) \times P \quad (4)$$

where R(e) is the rotation matrix.

The resolution of the underexposure image is lowered to ½ by sampling the pixels alternately, and a convolution calculation including the above-described computational processing is performed with respect to only pixels having a signal intensity not lower than 80% of the maximum value of the image signal, thereby calculating a flare image. Then, the resolution of the flare image obtained is doubled while executing interpolation processing, and the flare image is subtracted from the image taken under correct exposure.

The above-describe arithmetic processing is executed with respect to the R and B color components of the image (unwanted orders of diffracted light do not occur in the G color component of the image). Thus, it is possible to obtain a clear color image with a minimal flare image.

As will be clear from the foregoing description, the image pickup apparatus according to the present invention is arranged to select electric signals having an intensity higher than a predetermined value from those obtained from an electronic image pickup device and to calculate the convolution of an object image formed from the selected electric signals with the point spread function of unwanted-order diffracted light, thereby obtaining a flare signal. Then, the flare signal is reduced or removed from a signal representing the object image. Therefore, the number of pixels to be subjected to the calculation becomes small, and the time required for the computational processing is shortened. Further, it is possible to obtain a clear image free from deterioration due to a flare image.

What we claim is:

1. In an image pickup apparatus comprising an image-forming optical system which forms an image of an object; an electronic image pickup device which converts the image into electric signals; and signal processing means for converting the signals obtained from said electronic image pickup device into a displayable image signal, the improvement wherein said image-forming optical system includes a diffraction surface having one of an image-forming action and an action whereby image-forming performance is improved, and wherein in order to reduce a diffraction image formed by an unwanted order of diffracted light, which is unnecessary for image formation, in the image converted into said image signal, said signal processing means has means for storing a point spread function of the unwanted order of diffracted light; means for selecting electric signals having an intensity hi her than a predetermined value from the electric signals obtained from said electronic image pickup device and for calculating a convolution of an object image formed from the selected electric signals with the point spread function o the unwanted order of diffracted light to obtain a flare signal; and means for reducing or removing said flare signal from a signal representing said object image.

2. An image pickup apparatus according to claim 1, wherein said predetermined value is in a range of from 30% to 90% of a maximum value of an intensity of the image signal.

3. In an image pick p apparatus comprising an image-forming optical system which forms an image of an object; an electronic image pickup device which converts the image into electric signals; and signal processing means for converting the signals obtained from said electronic image pickup device into a displayable image signal, the improvement wherein said image-forming optical system includes a diffraction surface having one of an image-forming action and an action whereby image-forming performance is improved, and wherein in order to reduce a diffraction image formed by an unwanted order of diffracted light, which is unnecessary for image formation, in the image converted into said image signal, said image pickup apparatus takes a plurality of object images under different exposure conditions almost simultaneously, and said signal processing means has means for storing a point spread function of the unwanted order of diffracted light; means for selecting electric signals having an intensity higher than a predetermined value from electric signals obtained from at least one of said object images and for calculating a convolution of the object image having the selected electric signals with the point spread function of the unwanted order of diffracted light to obtain a flare signal; and means for reducing or removing said flare signal from a signal representing said object image.

4. An image pickup apparatus according to claim 3, wherein said signal processing means has means for obtaining an image with a wide dynamic range from said plurality of object images taken under different exposure conditions.

5. An image pickup apparatus according to claim 3, wherein, among said plurality of object images taken under different exposure conditions, an image taken with a short exposure time is convolved with the point spread function of the unwanted order of diffracted light.

6. In an image pickup apparatus comprising an image-forming optical system which forms an image of an object; an electronic image pickup device which converts the image into electric signals; and signal processing means for converting the signals obtained from said electronic image pickup device into a displayable image signal, the improvement wherein said image-forming optical system includes a diffraction surface having one of an image-forming action and an action whereby image-forming performance is improved, and wherein in order to reduce a diffraction image formed by an unwanted order of diffracted light, which is unnecessary for image formation, in the image converted into said image signal, said signal processing means has means for storing a point spread function of the unwanted order of diffracted light; and means for selecting electric signals having an intensity higher than a predetermined value from the electric signals obtained from said electronic image pickup device and for calculating a convolution of an object image formed from the selected electric signals with the point spread function of the unwanted order of diffracted light after lowering a resolution of the object image, thereby obtaining a flare signal, and then reducing or removing said flare signal from a signal representing said object image.

7. In an image pickup apparatus comprising an image-forming optical system which forms an image of an object; an electronic image pickup device which converts the image into electric signals; and signal processing means for converting the signals obtained from said electronic image pickup device into a displayable image signal, the improvement wherein said image-forming optical system includes a diffraction surface having one of an image-forming action and an action whereby image-forming performance is improved, and wherein in order to reduce a diffraction image formed by an unwanted order of diffracted light, which is unnecessary for image formation, in the image converted into said image signal, said signal processing means has means for storing a point spread function of the unwanted order of diffracted light; and means for calculating a convolution of an object image having electric signals having an intensity higher than a predetermined value, which are selected from the electric signals obtained from said electronic image pickup device, with the point spread function of the unwanted order of diffracted light after lowering a resolution of the object image, thereby obtaining a flare signal, and then restoring the resolution of the obtained flare signal to a previous level and reducing or removing said flare signal from a signal representing said object image.

8. An image pickup apparatus according to claim 1, 2, 6 or 7, wherein when the convolution is calculated in said signal processing means, point spread functions calculated under an identical light source are used regardless of a light source used when the image is taken.

9. An image pickup apparatus according to claim 1, 2, 6 or 7, wherein said signal processing means has a plurality of point spread functions prepared according to a condition of an image-forming lens and an image height, and when the convolution is calculated in said signal processing means, a point spread function for an arbitrary image height is calculated by an approximate operation from a plurality of adjacent point spread functions.

10. An image pickup apparatus according to claim 1, 2, 6, or 7, wherein in said signal processing means, a resolution for expressing the point spread function is lowered below a resolution of the object image, and when the convolution is calculated, intensity data concerning either of the point spread function and the object image is calculated by an approximate operation in order to make the resolution for expressing the point spread function and the resolution of the object image equal to each other.

11. An image pickup apparatus according to claim 1, 2, 6 or 7, wherein when the convolution is calculated in said signal processing means, the point spread function is rotated about a center o an image field of the object image.

* * * * *